July 12, 1927. 1,635,782

M. W. DREIBELBIS

AUTOMATIC AIR BRAKE COUPLER

Filed Nov. 3, 1926

Milton W. Dreibelbis,
Inventor

By _____
Attorney

Patented July 12, 1927.

1,635,782

UNITED STATES PATENT OFFICE.

MILTON W. DREIBELBIS, OF LEESPORT, PENNSYLVANIA.

AUTOMATIC AIR-BRAKE COUPLER.

Application filed November 3, 1926. Serial No. 145,959.

This invention relates to improvements in air pipe couplings, and it is intended more particularly for use on railway cars, in which coupling of the pneumatic system is to be accomplished.

My object in the present instance is to provide a very simple and yet effective construction for automatically accomplishing such air pipe coupling, and to this end I have provided a simple structure, applicable to the ends of a car, both ends being provided with a like device, thus avoiding all annoyance such as is caused where the meeting members of a coupler differ, as for instance where a male and female connection is to be made.

My device consists of a spring backed, compressible bumper member carrying a valve actuating attachment, and a valve on the air pipe in line and capable of being actuated by said attachment to control the air.

The invention is extremely simple in construction and cheap as to cost of installation and upkeep.

The invention is more fully described in the following specification and clearly illustrated in the accompanying drawing in which:—

Figure 1:
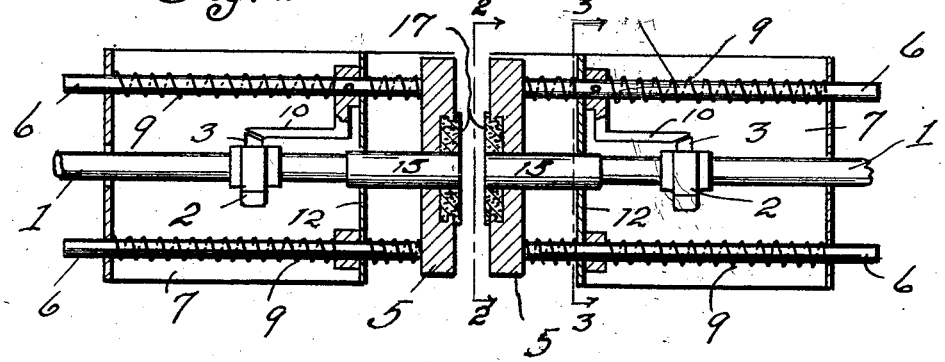
Figure 1 is a side elevational view of my coupler, showing two like members just at meeting position, and partly in cross section.
Figure 2:
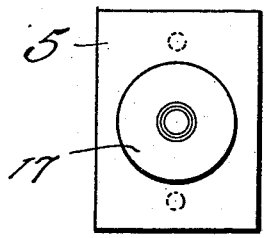
Figure 2 is a section taken through 2—2 of Fig. 1.
Figure 4:
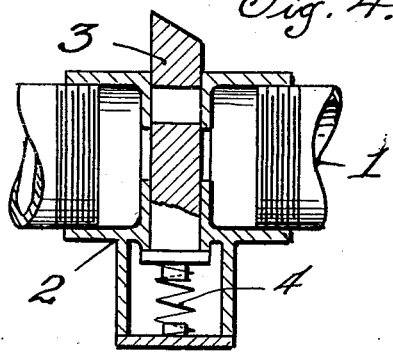
Figure 4 is a detail view of the valve, in enlarged section.
Figure 3:
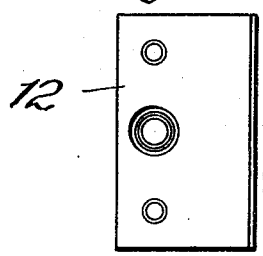
Figure 3 is a sectional view taken through the line 3—3 of Figure 1.

The numeral 1 designates the air pipes on two opposed or meeting cars, and these pipes are provided each with a check valve 2 which valves are opened by depressing their valve stems 3, which latter have springs 4 to return the valve to normal position. The upper edges of these valve stems are slightly inclined, as shown in Figure 4.

The numeral 5 designates a bumper plate or head and is formed with a pair of rods 6, which rods are mounted in supports 7, attached to the car in any suitable manner. The rods are surrounded by coil springs 9, which springs are compressed when the heads of opposing cars meet. One of the rods 6, in each support, is provided with a bar or actuating attachment 10, the extremity of which lies within the path, longitudinally, of the spring backed valve stem of the check valve.

Each of the supports 7 is provided with a face plate 12, through which the rods pass, and this plate also has a central perforation through which the air pipe passes. This air pipe, at the point approximately where it passes through the plates 12, is telescopic in form, one portion thereof, 15, being carried by the head plate or bumper, 5. This head plate is provided with a central perforation, forming the air line, and in this perforation I place a relatively soft washer 17, which projects slightly beyond the face of the head member, so that when the two head members come into contact with each other, these washer members, surrounding the air line, will meet and prevent leakage of air.

It is evident that when two cars provided with my air coupler are brought together, the head members will move back, the telescopic air line will permit the valve actuating attachment carried by the head to contact with the stem of the check valve and open it, thus forming the air connection.

It is evident that, when the separation of the cars takes place, the elongated contacting portion of the actuating attachment will slide along the top of the check valve stem, and prevent its closing until the end thereof is reached, which will be at the time the separation is desired.

Having thus fully described my invention, what I claim and desire to secure by Letters Patent is:—

1. In an automatic air line coupler for railway cars, a pair of like devices carried by meeting cars, comprising bumper head plates, a pair of rods carried by each head plate, a perforated face plate for each device, springs surrounding each rod and bearing against said face plates, said bumper head plates being mounted for horizontal movement, a telescopic air line, one portion of which is carried by said perforated plate and is provided with a check valve and the other portion by the head plate, said valve having a valve stem with a tapered projecting end, a valve actuating bar carried by one of said rods and so located with relation to the check valve as to depress the valve stem by contacting with its tapered end and open it, when the movement of the head plate begins, and to hold it open until the head plate has returned to full forward position.

2. In an automatic air brake coupler for cars, a support having perforated end plates, a bumper head plate having spring backed rods movable in said perforated plates, a telescopic air pipe one portion of which is carried by the said perforated end plates and is provided with a check valve, and the other portion by the bumper head plate, said valve having a valve stem with a projecting tapered end, a bar carried by said rods, having a tapered portion adapted to engage said tapered end of the valve stem to open the valve upon rearward movement of said bumper head plate and being of sufficient length to hold the valve open during the entire rearward movement of the bumper head plate.

In testimony whereof I affix my signature.

MILTON W. DREIBELBIS.